United States Patent [19]

George et al.

[11] 4,358,500

[45] Nov. 9, 1982

[54] FLAME RESISTANT INSULATING FABRIC COMPOSITIONS CONTAINING INORGANIC BONDING AGENT

[75] Inventors: Stephen George; Thomas George, both of Bronx, N.Y.

[73] Assignee: Subtex, Inc., Hartsdale, N.Y.

[21] Appl. No.: 294,771

[22] Filed: Aug. 20, 1981

[51] Int. Cl.³ .......................... B32B 7/00; B05D 3/02
[52] U.S. Cl. .................................. 428/246; 427/380;
427/419.1; 427/419.2; 428/251; 428/253;
428/254; 428/284; 428/285; 428/343; 428/354
[58] Field of Search ............... 428/246, 251, 253, 254,
428/284, 285, 343, 354; 427/376.1, 376.2, 379,
380, 402, 407.1, 419.1, 419.2, 419.7

[56] References Cited

U.S. PATENT DOCUMENTS 4,282,284  8/1981  George .................................. 428/251

*Primary Examiner*—William J. Van Balen
*Attorney, Agent, or Firm*—Scully, Scott, Murphy and Presser

[57] ABSTRACT

An inorganic composition prepared from colloidal silica, monoaluminum phosphate and aluminum chlorohydrate is employed as a bonding agent to bond refractory materials to a porous base fabric, such as fiberglass, to prepare fabric compositions that are flame and heat resistant and possess dielectric properties.

14 Claims, No Drawings

FLAME RESISTANT INSULATING FABRIC COMPOSITIONS CONTAINING INORGANIC BONDING AGENT

CROSS-REFERENCE TO RELATED APPLICATIONS

This is related to commonly assigned U.S. Patent application Ser. No. 225,888, filed Jan. 19, 1981; Ser. No. 073,362, filed Sept. 7, 1979, now U.S. Pat. No. 4,282,284; Ser. No. 931,121, filed Aug. 4, 1978, now abandoned, and U.S. patent application Ser. No. 294,770 filed Aug. 20, 1981 which is a continuation-in-part of said application Ser. No. 225,888.

BACKGROUND OF THE INVENTION

1. Field of the Invention

This invention relates to a heat and flame resistant, flexible, insulating fabric. More particularly, it relates to a refractory coated porous base fabric. This invention especially relates to a heat and flame resistant coated porous base fabric employing an inorganic composition to bond the coating to the fabric.

2. Description of the Prior Art

Asbestos and other thermal protection materials are employed as protective mats for welding operations, furnace linings, fire-resistant linings and the like to provide protection from flames and thermal extremes as well as for dissipation of heat at a high rate. Although in each application reasonable performance is obtained, the selected material has limitations in its range of uses and in its effectiveness, even in uses for which it is particularly adapted. In addition, asbestos has found less utility in certain uses because of recent findings that it may constitute a health hazard.

Ceramics and/or glass fibers have been used heretofore to prepare high temperature electrical insulating tape. In addition, coated fabrics and ceramic structures have been prepared with a combination of glass fiber fabrics and metal oxides.

U.S. Pat. No. 2,587,916 of Squier discloses a heat-detecting cable of a pair of electrical wires separated by a glass composition containing barium oxide and/or boron oxide which is non-conductive at normal temperature but is conductive at high temperatures. In one embodiment, the glass is in the form of a fabric having finely divided refractory materials distributed therein to enhance the ability to withstand high temperature. The barium oxide and/or boron oxide containing fiberglass tape does not insulate the wires at high temperature but rather provides a conductive path so as to detect high temperatures.

U.S. Pat. No. 3,602,636 of Evans discloses an electrical cable where the conductors are helically wrapped with an open weave glass cloth having a coating of a flame resistant synthetic rubber together with an extruded sheath of polyvinylchloride (PVC) or the like covering the assembled cable.

U.S. Pat. No. 3,632,412 of Blance et al. discloses a pressure sensitive adhesive for a Class F (high temperature service) electrical tape. The adhesive is an interpolymer of acrylates, methacrylates and hydroxyacrylates or hydroxymethacrylates. Glass cloth is included among the useful backing members for this tape.

U.S. Pat. No. 3,013,902 of Bugosh discloses fabrics coated with colloidal alumina and a final coating of a polymer having a plurality of free carboxylic acid groups. Glass fibers are included in the list of materials which may comprise the fabric substrate. These textile products have improved resistance to soiling and improved washability.

U.S. Pat. No. 3,095,336 of Church et al. discloses the preparation of ceramic articles laminated with glass fabric by impregnating glass fibers with a mixture of a thermosetting resin and a ceramic filler, curing the resin, heating to gasify the resin and then heating to an elevated temperature to fuse the glass fabric and the ceramic filler to produce rigid, laminated ceramic structures having high strength characteristics.

U.S. Pat. No. 2,022,827 of Ruben discloses an impregnated textile or fibrous sheet useful as electrical insulation. The textile is composed of silk or cotton and is impregnated with a mixture of finely divided inorganic refractory materials in an organic binder plus an inorganic binder. The organic binder includes shellac, oleoresinous varnishes, phenol varnishes, rubber varnishes, oil-rubber varnishes or alkyl-resin lacquers. The inorganic binder is usually a boron compound although such materials as antimony oxide, zinc oxide, or ammonium phosphate may also be used.

U.S. Pat. No. 3,861,425 of Clark relates to a fibrous glass batting or board useful as an insulating material for the surfaces of heating and cooling ducts and, in particular, to a hardenable water base coating applied to the surface of this insulating material. The coating comprises an aluminum or magnesium hydrate, a vinyl acrylic latex binder and a fire retardant of sodium borate or boric acid.

Commonly assigned applications Ser. Nos. 073,362 and 225,888 and the recently-filed continuation-in-part application thereof disclose a heat resistant, flexible, refractory, insulating fabric composition of a porous base fabric, preferably a knitted fiberglass fabric, coated with heat resistant refractory materials, such as alumina and zirconia, and an organic bonding agent, such as acrylic latex alone or admixed with colloidal silica. A polymeric coating, such as polyvinyl chloride, may be formed over the coated fabric to provide abrasion resistance to the composition. A feature of this composition resides in the fact that the refractory materials are bonded in the interstices as well as to the surface of the base fabric, such that a significant amount of the fabric's flexibility and stretch properties are retained. This fabric composition has a variety of uses and therefore may be employed as the dielectric in insulated electrical wire or cable, as protective mats and curtains in welding operations, as linings for fire resistant machine and appliance covers, as duct and pipe insulation, as wrappings for engine exhaust systems and the like. When this fabric composition is exposed to heat and high temperatures, the organic bonding agent containing the refractory materials will decompose, causing the refractory materials to fuse into the softened surface of the knit fiberglass base fabric, enabling it to withstand intense heat and elevated temperatures well beyond the normal melt temperature of the fiberglass fabric. The resulting fabric structure will have ceramic qualities and will not soften, melt, drip or lose its insulating properties.

Although the organic components of the bonding agent of these prior art fabric compositions may not produce a flame when exposed to a flame or the intense heat developed by a flame, i.e. temperature of 1750° F. and above, they will decompose at these temperatures resulting in some products of combustion in the form of smoke and fumes which may prove harmful to persons in the vicinity.

A heat resistant insulating fabric composition similar to those of the prior art but which does not emit products of combustion in the form of smoke and/or fumes would be desirable.

It is therefore an object of this invention to provide a heat resistant, insulating fabric composition which does not emit products of combustion in the form of smoke and/or fumes when exposed to flames and/or high temperatures.

It is another object of this invention to provide a method for preparing a heat resistant, insulating fabric composition which does not emit products of combustion in the form of smoke and/or fumes when exposed to flames and/or high temperatures.

SUMMARY OF THE INVENTION

These and other objects of this invention have been achieved by preparing a heat resistant, flexible refractory, insulating composition wherein an inorganic composition is utilized as the bonding agent in the fabric compositions disclosed in commonly assigned patent applications Ser. No. 073,362 and Ser. No. 225,888 and the recently filed continuation-in-part thereof.

The present invention relates to a heat resistant, refractory, insulating composition comprising:

(a) a porous base fabric;

(b) a refractory coating comprising refractory materials and a bonding agent, said refractory coating formed on the surface and interstices of said fabric and said refractory materials being capable of fusing with the porous base fabric at elevated temperatures; and (c) a saturation coating formed on the outside surface of said refractory coating, said bonding agent and said saturation coating being an inorganic composition comprising colloidal silica, monoaluminum phosphate and aluminum chlorohydrate.

This invention also relates to the refractory, insulating composition described hereinbefore which has been provided with an abrasion resistant polymeric coating formed on the outside surface of the saturation coating.

This invention is also concerned with a method of preparing the bonding agent and the saturation coating for the above fabric composition which comprises:

separately adding monoaluminum phosphate and aluminum chlorohydrate to colloidal silica to form an inorganic composition.

In addition, this invention is also concerned with a method of preparing the above fabric compositions which comprises:

(a) coating a porous base fabric with a refractory coating comprising refractory materials and the inorganic composition prepared by the above method, (b) drying the refractory coating, (c) applying the inorganic composition prepared by the above method to the dry refractory coating formed on the fabric to form a saturation coating, (d) drying the coated fabric to produce a dry saturation coating on the dry refractory coating.

DESCRIPTION OF THE PREFERRED EMBODIMENTS

The present invention is an improvement of the heat resistant, flexible, refractory, insulating fabric compositions disclosed in commonly assigned U.S. patent application Ser. No. 073,362 and Ser. No. 225,888 and the recently filed continuation-in-part thereof, the entire contents of said three applications being incorporated herein by reference.

Briefly, the fabric compositions of this invention differ from those of the commonly assigned applications in that the organic compound-containing bonding agent of the prior art is replaced with an inorganic composition. This inorganic composition comprises colloidal silica, monoaluminum phosphate and aluminum chlorohydrate.

Although the compositions of the commonly assigned applications referred to above are heat and flame resistant and have dielectric properties, the organic components in the bonding agent of these compositions can emit smoke and noxious fumes when exposed to high temperatures, e.g. above about 1750° F. In contradistinction to this, the compositions of the present invention substitute inorganic materials for the organic components of the bonding agent employed heretofore so as to provide fabric compositions with the same heat and flame resistance and dielectric properties of the prior art compositions but which do not emit products of combustion in the form of smoke and noxious fumes encountered with these compositions. When the compositions of the present invention are exposed to these high temperatures, no products of combustion in the form of smoke or fumes are produced.

The flame resistant fabric of the invention may be constructed of a knit fiberglass base fabric having knit yarns and fill yarns.

Satisfactory results have been obtained employing knit yarns comprised of DE type fiberglass with a yarn designation of DE-150-1/0 and fill or lay in yarns comprised of fiberglass with a yarn designation of DE-150-1/0.

The porous base fabric of knit fiberglass used in the preferred embodiment of fabric construction may be produced on warp knitting machinery such as the Raschel type warp knitting machines, manufactured by Karl Mayer, GmbH, Germany; Liba, GmbH, Germany; Rockwell International, United States; and the Kidde Textile Machine Company, United States with the following preferred specifications.

| | |
|---|---|
| Fabric Thickness: | .016 inches. |
| Fabric Weight: | 9 ounces per square yard. |
| Knit Pattern: | Cable stitch and weft lay in. |
| Knit Construction: | 3 Bar. |

1st Bar: Knit yarn-cable stitch 20 knitting stitches per inch of fabric width (yarn: fiberglass DE-150-1/0)

2nd Bar: lay in yarn-weft lay in 24 stitches or courses per inch of fabric length (yarn: fiberglass DE-150-1/0)

3rd Bar: reinforcing yarn (optional) (yarn: fiberglass DE-150-1/0)

As will be understood by those skilled in the art, the knit fiberglass substrate fabric, though preferably formed of all fiberglass yarns, may be constructed with other kinds of fire resistant knit yarns or with only the weft lay-in yarn comprised of fiberglass. The substrate or porous base fabric may also be a woven fiberglass or a non-woven, porous web of fiberglass.

As used herein the term "fabric" includes materials which are woven, knitted, felted, fused, non-woven or otherwise constructed from fibers. Since the base fabric must have a porosity there must be an openness to the texture of the fabric so as to permit the refractory coating to impregnate the surface of the fabric and fill, at least partially, some, if not all, of the interstices of the porous fabric.

The refractory coating which is applied to both sides and impregnates the interstices of the porous base fabric comprises heat resistant refractory materials intermixed or dispersed in a bonding agent. The refractory materials may be any of the usual known refractory materials in finely divided form which will fuse with the porous base fabric when subjected to elevated temperatures, e.g., above about 1750° F., and includes compounds of aluminum, calcium, chromium, magnesium, silicon, titanium, zirconium and the like, such as aluminum oxide, calcium oxide, magnesium oxide, silicon oxide, titanium oxide, zirconium oxide, aluminum silicate, calcium silicate, magnesium silicate, silicon carbide, zirconium carbide and the like. Alumina, zirconia, calcium silicate and silicon dioxide are preferred, alone or in combination. These materials enable the compositions of this invention to maintain their heat insulating ability after prolonged exposure to temperatures in the 2200° F. range.

In addition to these ceramic-type materials, other useful refractory materials may be employed to provide compositions which may be employed at temperatures in the 4000° F. plus range. These refractory materials include, for example, zirconium oxide, silicon carbide, alumina silica fiber and thermal carbon black. This latter material is a non-electrical conducting form of carbon black which is resistant to temperatures as high as 7000° F.

An all inorganic composition is employed in the present invention as the bonding agent for the refractory materials in the refractory coating. The refractory coating is applied to the porous base fabric and then subjected to drying to cause the removal of water and a bonding of the refractory material to the porous base fabric. A saturation coating of the inorganic composition is then applied over the refractory base coating and dried. This saturation coating provides additional chemical bonding between the porous base fabric and the refractory materials creating a more secure bond of these refractory materials to the porous base fabric. Further, the saturation coating of the inorganic composition, when fully dried, provides a smooth surface to the fabric composition.

The inorganic composition of this invention is liquid and is formed from colloidal silica, monoaluminum phosphate and aluminum chlorohydrate. The latter two materials cannot normally be employed in combination since when they are combined the result is highly exothermic, producing a solid material which becomes adhesive. By employing the colloidal silica, which acts as a liquid moderator, the monoaluminum phosphate (MAP) and the aluminum chlorohydrate (ACH) may be used in combination to achieve the desired results.

In formulating the inorganic composition employed in this invention, the quantities of the components may be varied over a considerable range. It is usually convenient to provide the monoaluminum phosphate and the aluminum chlorohydrate in a weight ratio of MAP to ACH of about 0.8:1.0 to about 1.5:1.0, preferably about 1.0:1.0 to about 1.25:1.0. The quantity of colloidal silica to be employed is based on the weight ratio of the liquid colloidal silica to the combined weights of the MAP and the ACH. A weight ratio range of colloidal silica to MAP plus ACH of about 1.6:1 to about 1:1, preferably about 0.75:1 to 0.85:1 has been found useful.

In preparing this inorganic composition, the required amounts of MAP and ACH are separately added to the colloidal silica. Then the refractory materials are added to complete the formulation of the refractory coating. This coating may be coated onto one side of the porous base fabric and dried at about 250° F. to cause removal of the water from the colloidal silica which allows the MAP and the ACH to react slowly producing a slowly thickening material which bonds the refractory materials to the porous base fabric. After the refractory coating is satisfactorily dried to form the desired coating on one side of the base fabric, a coating is applied in a similar fashion to the other side. Further bonding of the refractory materials and the fabric is obtained by applying the inorganic composition as a saturation coating to the dried surface of the refractory coating and then drying this saturation coating.

Where the fabric composition will be subject to abrasive forces for which the saturation coating of the inorganic composition provides only minimal protection, a polymeric coating, as described in the above commonly assigned patent applications, may be applied over the saturation coating. This polymeric coating may be applied at a coating density of approximately 1 ounce per square yard, based on dry net weight, to improve the surface abrasion qualities of the fabric and to seal in and contain any refractory materials that may otherwise loosen from the fabric as it is stretched in the wire and/or cable wrapping process or subject to abrasion in use.

The polymeric coating may be applied to both surfaces of the saturation coating or, optionally, to only one surface, particularly where a flameproof adhesive is to be applied to the other surface of the saturation coating.

The polymer used in the polymeric coating should be self-extinguishing when exposed to a flame or the intense heat developed by a flame, i.e., temperatures of 1750° F. and above, even though it may decompose at these elevated temperatures or exhibit an instantaneous flash-off. Polyvinyl chloride resin is the preferred polymer used in the polymeric coating. This coating is a mixture of selected plasticizers, stabilizers and modifiers, dispersion resins and oxides. A number of components are combined with the polyvinyl resins to provide the required properties of high temperature resistance and flexibility. The polymeric coating preferred in this invention has the formulation described in the above commonly assigned patent applications which have been incorporated herein by reference.

Drying the inorganic composition, after it is applied to the fabric as part of the refractory coating or as the saturation coating, may be achieved by any of a number of procedures. Temperatures of about 250° F. are usually effective, although lower or higher temperatures may be employed, where desired. An infra red source of heat has been found effective. Equally useful is a stream of forced dry air. Passing the prepared fabric through a drying oven in a continuous fashion is an effective drying technique where the fabric composition is being prepared in a continuous operation.

The dried inorganic composition of MAP, ACH and colloidal silica imparts a stiffness to the finished fabric composition. It is possible to return flexibility to this fabric composition, especially one prepared from a knitted fiberglass, by cracking the MAP, ACH bond. This may be achieved by passing the dry coated fabric over a means to induce a sharp fold or crease in the finished fabric composition. For example, passing the fabric over a 90° edge in a bar or passing it around or past an idler roller which causes a sharp change in direction will crack the bond and provide the desired flexibility.

The following serves to illustrate the subject invention. An inorganic composition usefully employed in this invention contains the following:

|  | Parts (By Weight) |
|---|---|
| Colloidal Silica (Nyacol 2034A) | 30 |
| Monoaluminum Phosphate (MAP) | 20 |
| Aluminum Chlorohydrate (HPB-5025) | 20 |
|  | 70 |

The liquid inorganic composition is formed by the slow addition of MAP to the colloidal silica while mixing, followed by the slow addition of the ACH while mixing. Mixing should be continued until a slight increase in viscosity occurs and a smooth consistancy is achieved. The colloidal silica acts as a moderator to delay the rapid exothermal chemical reaction that would normally occur when MAP is mixed with ACH. Although the rapid chemical reaction between the MAP and the ACH is greatly slowed by the colloidal silica moderator, a partial reaction does occur which is the cause of the initial viscosity increase when ACH is added to the mixture.

A high temperature refractory coating may be formed by the addition of a high temperature refractory material, such as zirconium oxide powder (325 Mesh), to the liquid inorganic composition in the ratio of about 70 parts inorganic composition to about 40 parts of zirconium oxide powder and through mixing to a smooth consistancy. Other refractory materials, alone or in combination, for example, alumina-silica fiber or thermal carbon black, may be employed as well.

A knitted fiberglass fabric is coated and impregnated on both sides with this refractory coating at a density of approximately 10 ounces per square yard, based on dry net weight, which represents about 50% of the overall weight of the impregnated base fabric. After the coating is applied to one side of the fabric, it is passed through a drying oven to remove the water from the coating material. Removal of the water allows the exothermal reaction of the monoaluminum phosphate and the aluminum chlorohydrate to continue which chemically bonds the refractory material to the fiberglass base fabric. Then a refractory coating is applied to the other side of the fiberglass base fabric and is dried and chemically bonded in the same manner. To complete the fabrication of this heat resistant fabric, a saturation coating of the inorganic composition is applied over the refractory base coating on both sides of the fabric and dried in the drying oven. This saturation coating provides additional chemical bonding between the base fiberglass fabric and the refractory materials creating a more secure bond of these refractory materials to the base fiberglass fabric. Further, the saturation coating of the inorganic composition, when fully reacted, provides a smooth surface to the fabric.

This fabric composition may be used as such to provide heat and flame protection and/or electrical insulation as required. Where flexibility of the coated fabric is desired, it should be passed through a 90 degree bend to break the coating bond at points in the base fiberglass fabric that connect one course with another. Abrasion protection may be obtained by applying an appropriate polymeric coating to the composition, as described herein.

The fabrics prepared in accordance with this invention may be employed in the same manner as those disclosed in the commonly assigned patent applications referred to hereinbefore. Thus, they may serve, for example, as electrical insulating tape, welding curtains and mats, pipe and dust insulation, fire resistant linings and the like where a material is required which is capable of enduring high temperatures and providing thermal protection and dielectric properties.

What is claimed is:

1. A heat resistant, flexible, refractory, insulating composition comprising:
    (a) a porous base fabric;
    (b) a refractory coating comprising refractory materials and a bonding agent, said refractory coating formed on the surface and interstices of said fabric and said refractory materials being capable of fusing with the porous base fabric at elevated temperatures; and
    (c) a saturation coating formed on the outside surface of said refractory coating,
    said bonding agent and said saturation coating being an inorganic composition comprising colloidal silica, monoaluminum phosphate and aluminum chlorohydrate.

2. A heat resistant, flexible, refractory insulating composition according to claim 1 including the following additional element:
    (d) an abrasion resistant polymeric coating formed on the outside surface of said saturation coating.

3. A heat resistant, flexible, refractory insulating composition according to claims 1 or 2 wherein the refractory coating and the saturation coating are applied to both sides of the porous base fabric.

4. A heat resistant, flexible, refractory insulating composition according to claim 3 wherein the polymeric coating is formed on the outside surface of one of the saturation coatings and an adhesive is formed on the outside surface of the other saturation coating.

5. A heat resistant, flexible, refractory insulating composition according to claim 3 wherein the polymeric coating is formed on the outside of both of the saturation coatings.

6. A heat resistant, flexible, refractory insulating composition according to claim 5 wherein an adhesive is formed on the surface of one of the polymeric coatings.

7. A heat resistant, flexible, refractory insulating composition according to claim 1 wherein the porous base fabric is a knitted fiberglass, a woven fiberglass or a non-woven, porous web of fiberglass.

8. A heat resistant, flexible, refractory insulating composition according to claim 1 wherein the refractory materials are alumina, zirconia, calcium silicate, silicon dioxide or mixtures thereof.

9. A heat resistant, flexible, refractory insulating composition according to claim 1 wherein the refractory materials are silicon carbide, alumina silica fiber or thermal carbon black.

10. A method of preparing the bonding agent and the saturation coating of claim 1 which comprises:
    separately adding monoaluminum phosphate and aluminum chlorohydrate to colloidal silica to form an inorganic composition.

11. A method for preparing the composition of claim 1 which comprises:
   (a) coating a porous base fabric with a refractory coating comprising refractory materials and the inorganic composition prepared by the method of claim 9,
   (b) drying the refractory coating,
   (c) applying the inorganic composition prepared by the method of claim 9 to the dry refractory coating formed on the fabric to form a saturation coating, and
   (d) drying the coated fabric to produce a dry saturation coating on the dry refractory coating.

12. A method according to claim 11 including the following addition step:
   (e) passing the dry coated fabric of step (d) over a means for inducing a sharp fold in the coated fabric.

13. A method according to claim 12 wherein the means is a bar or an idler roller.

14. A method according to claim 11 including the following additional step:
   (f) applying an abrasion resistant polymeric coating to the outer surface of the saturation coating.

* * * * *